(12) United States Patent
Wang et al.

(10) Patent No.: US 8,467,099 B2
(45) Date of Patent: Jun. 18, 2013

(54) DIRECTIONAL HALFTONE METHOD WITH ENHANCED EDGE AND DETAIL RENDITION

(75) Inventors: Shen-ge Wang, Fairport, NY (US); Edgar A. Bernal, Webster, NY (US); Robert P. Loce, Webster, NY (US); Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 248 days.

(21) Appl. No.: 13/108,235

(22) Filed: May 16, 2011

(65) Prior Publication Data

US 2012/0293842 A1    Nov. 22, 2012

(51) Int. Cl.
*H04N 1/405* (2006.01)

(52) U.S. Cl.
USPC ...................................................... 358/3.06

(58) Field of Classification Search
None
See application file for complete search history.

(56) References Cited

U.S. PATENT DOCUMENTS

| | | | | |
|---|---|---|---|---|
| 4,149,183 A * | 4/1979 | Pellar et al. | | 358/534 |
| 4,196,451 A * | 4/1980 | Pellar | | 358/534 |
| 4,930,023 A * | 5/1990 | Yakame | | 358/3.26 |
| 5,696,612 A * | 12/1997 | Thornton | | 358/534 |
| 5,745,660 A * | 4/1998 | Kolpatzik et al. | | 358/3.19 |
| 5,859,955 A * | 1/1999 | Wang | | 358/1.9 |
| 6,956,676 B2 * | 10/2005 | Zeck et al. | | 358/3.19 |
| 6,989,913 B2 * | 1/2006 | Asai | | 358/1.9 |
| 7,239,429 B2 * | 7/2007 | Huang et al. | | 358/3.06 |
| 7,532,365 B2 * | 5/2009 | Asai et al. | | 358/3.13 |
| 7,619,777 B2 * | 11/2009 | Lee et al. | | 358/3.06 |
| 7,626,730 B2 * | 12/2009 | Tai et al. | | 358/3.06 |
| 2003/0197878 A1 * | 10/2003 | Metois et al. | | 358/1.9 |
| 2007/0081192 A1 * | 4/2007 | Tai et al. | | 358/3.06 |
| 2007/0223044 A1 * | 9/2007 | Bailey et al. | | 358/3.06 |
| 2008/0074701 A1 * | 3/2008 | Asai | | 358/3.09 |
| 2008/0084583 A1 * | 4/2008 | Lapstun et al. | | 358/3.06 |
| 2009/0034006 A1 * | 2/2009 | Blondal et al. | | 358/3.13 |
| 2009/0034008 A1 * | 2/2009 | Croft et al. | | 358/3.19 |
| 2012/0106835 A1 * | 5/2012 | Bernal et al. | | 382/162 |
| 2012/0262583 A1 * | 10/2012 | Bernal et al. | | 348/164 |
| 2012/0274984 A1 * | 11/2012 | Wang et al. | | 358/3.2 |
| 2012/0274985 A1 * | 11/2012 | Bernal et al. | | 358/3.06 |

OTHER PUBLICATIONS

Lau, Daniel L., Arce, Gonzalo R., and Gallaher, Neal C., "Green Noise Digital Halftoning", Dec. 1998, Proceedingings of the IEEE, vol. 86, No. 12.*
Oztan, Basak and Sharma, Gaurav, "Per-seperation clustered-dot color halftone watermarks: separation estimation based on spatial frequency content", Oct.-Dec. 2010, Journal of Electronic Imaging, vol. 19(4).*

(Continued)

*Primary Examiner* — Tammy Pham
*Assistant Examiner* — Edwin S Leland, III
(74) *Attorney, Agent, or Firm* — Fay Sharpe LLP

(57) ABSTRACT

As set forth herein, computer-implemented methods and systems facilitate halftoning by adapting $2^{nd}$ generation halftone techniques to the spatial frequency content of an image utilizing a spot function introduced in conjunction with a technique for determining seed locations, which results in halftone images exhibiting improved edge and detail rendition. A dominant orientation of pixels in an input image is employed to select a pre-generated stochastic screen used to determine the seed locations.

19 Claims, 8 Drawing Sheets

OTHER PUBLICATIONS

Wang, Shen-ge and Loce, Robert P., "Moire-Free Color Halftoning using Hexagonal Geometry and Spot Functions", SPIE-IS&T, vol. 7866.*

Ostromoukhov, Victor, "Pseudo-Random Halftone Screening for Color and Black&White Printing", Oct. 4-8, 1993, Proceedings of the 9th International Congress in Non-Impact Printing Technologies, pp. 579-582.*

Bernal, Edgar A., Wang, Shen-ge, and Loce, Robert P., "Parametrically Controlled Stochastic Seeded Clustered Halftones", SPIE-IS&T, vol. 8292.*

H. Z. Hel-Or et al. "Adaptive Cluster Dot Dithering" Journal of Electronic Imaging vol. 8, No. 2, pp. 133-144, 1999.

* cited by examiner

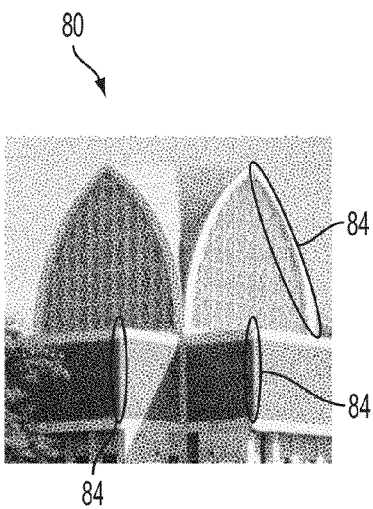
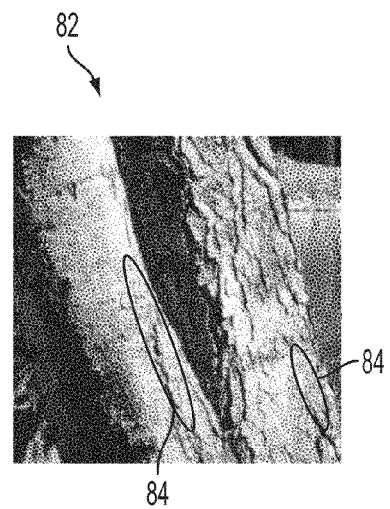
FIG. 6A                    FIG. 6B

DIRECTIONAL HALFTONE METHOD WITH ENHANCED EDGE AND DETAIL RENDITION

TECHNICAL FIELD

The presently disclosed embodiments are directed toward methods and systems for printing, reproducing or displaying images. More particularly, the teachings disclosed herein are applicable to methods and apparatuses wherein clustered-dot halftoning is implemented.

BACKGROUND

Digital images may be formatted as contone (continuous tone) images having a wide range of tonal values or may be formatted as coarsely quantized images having a limited number of tonal values, such as two levels for a binary image. Digital halftoning is a process of transforming a contone image to a coarsely quantized image. Digital halftoning is an important step in printing or displaying digital images possessing contone color tones because most printing processes are operating in a binary mode. Examples of such marking processes are offset printing presses, xerography, and ink-jet printing. In these processes, for each color separation of an image, a corresponding colorant spot is either printed or not printed at any specified image location, or pixel. Digital halftoning controls the printing of color dots formed by combinations of colorant spots of a colorant set, where the spatial averaging of the printed colorant dots, such as by the human visual system, provides the illusion of the required continuous tones.

Digital images and the resulting prints are formed of one or more colorant separations, also referred to as "color separations." A monochrome image is formed of one colorant separation, typically black. Process color images are typically constructed of cyan, magenta, yellow, and black separations. Duotone and tritone images are formed of two and three separations, respectively. Spot color images have multiple colorant separations, where at least one colorant is positioned spatially non-overlapping with other colorants. Extended colorant set images typically include the process-color colorant separations plus one or more additional colorant separations such as green, orange, violet, red, blue, white, varnish, light cyan, light magenta, gray, dark yellow, metallics, and so forth. In the present teachings, we will use the terms "color images", "color dots", "color spots", "colorant" and similar language to refer to images and marking systems with any number of colorants. The teachings herein apply particularly to any individual color separation of a digital image and resulting print, where that digital image or print can be composed of one or more separations. With the advent of computers, it is desirable for graphic artists and others to manipulate contone images and print them as halftone images. However, typical computer printers and typesetters are incapable of printing individual halftone dots in an infinite number of sizes. Instead, each halftone dot of a printed picture is in turn comprised of a collection of discrete, smaller "spots" or "pixels", which are generally the smallest marks a printer or typesetter can make.

A common halftone technique is called screening, which compares the required continuous color tone level of each pixel for each color separation with one or more predetermined threshold levels. The predetermined threshold levels are typically defined for halftone cells that are tiled to fill the plane of an image, thereby forming a halftone screen of threshold values. At a given pixel, if the required color tone level is greater than the halftone threshold level for that pixel, a "1" is generated in the halftone output, so that a colorant spot is printed at that specified pixel in the subsequent printing operation. If the required color tone at a given pixel is less than the halftone threshold level for that pixel, a "0" is generated in the halftone output, so that a colorant spot is not printed at that specified pixel in the subsequent printing operation. The output of the screening process is a binary pattern that controls the printing of multiple small spots or pixels that are printed. The printed spots can be grouped or "clustered" to form print structures that are relatively stable for a given printing process. These clusters are referred to as "clustered-dots" or "dots", and they are regularly spaced as determined by the size, shape, and tiling of the halftone cell. Conventional periodic halftone screens and halftone screen outputs can be considered as two-dimensional repeated patterns, possessing two fundamental spatial frequencies, which are completely defined by the geometry of the halftone screens.

In this manner, a "digital screen" is created as an array of cells with pixels having threshold values. Each pixel has a set position and a set threshold value within the cell. Likewise, each cell has a set position within the digital screen. To create a halftone image, a contone image is broken down into an array of pixel-sized samples, and the gray level of each contone sample is stored. Next, each contone sample is compared with the halftone threshold value of the corresponding pixel in the halftone screen, and the pixel is darkened in the subsequent print image if the gray level of the contone sample is greater than the threshold value for that pixel. All the pixels of the digital screen are at set positions with respect to one another, such that a contone sample from the "top-left" of the picture would be compared with a pixel at the "top-left" of the digital screen. In other words, each digital screen pixel has a position which corresponds with and is associated with a position on the original contone picture.

Halftoning attempts to render images to printable form while avoiding unwanted visual texture, known as moiré, and tone reproduction irregularities. The two key aspects of halftone screen design are the geometry of periodic dot placement and the shape of the halftone dots. Controlling halftone dot shape has been a lower priority in laser printers because printer pixel resolution, typically measured in rasters per inch referring to the number of smallest printable spots per unit length, has been too low. Consider, for example, the task of controlling dot shape of a 212 cell per inch (cpi) 45° halftone screen used with a printer having a resolution of 600 rasters/inch, where the halftone cell is only two rasters in height. As laser printing resolutions reach 2400 rasters/inch, and greater, controlling halftone dot shape provides a greater impact in improving a printed image.

As pixel resolution has increased with advancements in processor speed, memory capacity, printer and/or display capability, and the like, new options in halftone geometry have arisen. One area of development has been the so-called $2^{nd}$ generation stochastic screens, where nuclei (seeds) are placed in a stochastic manner using frequency modulation (FM) up to a particular gray level, then grown in size using amplitude modulation (AM) above that level. This approach leads to a limit of the highest allowable seed frequency, which is uniquely determined by the gray level at which the transition from FM to AM occurs. Conventional approaches have attempted to adjust seed frequency according to image busyness to improve detail rendition, but examples produced using such methods show relatively poor quality.

One class of methods of growing these dots operates in the frequency domain. These "green noise"-like methods adjust a frequency spectrum while neglecting fundamental design principles relating to dot shape and touching.

A second class of $2^{nd}$ generation stochastic screens uses random seeds, then applies a fixed threshold array to control growth around the seeds. While these methods attempt to control growth in the spatial domain, where better control is possible, a fixed threshold array on random seeds tends to produce high graininess and poor touch points.

A third class attempts to use parameters to control the growth within a Voronoi tessellation formalism. These methods seem to be using a sound strategy of defining a spatial tessellation and attempting to control growth and touching between the tiles for the purposes of print-to-print stability and uniformity. But, the growth control seems to be quite suboptimal, offering much less control than is available for growing periodic dots. The lack of control not only affects stability and uniformity, but does not allow dot shaping for aesthetic purposes, such as using rounder dots for faces, squarer sharper dots for graphics, extended highlight dots (avoid touching until into the shadows) and extended shadow dots (which touch early and focus on hole shape).

There is a need in the art for systems and methods that provide a $2^{nd}$ generation stochastic method that produces sharper rendition of graphically "busy" regions while overcoming the aforementioned deficiencies.

BRIEF DESCRIPTION

In one aspect, a computer-implemented method for generating a halftone image using a spot function to binarize pixels as a function of image frequency content and pixel orientation comprises receiving an input image, measuring spatial activity in a local area of the input image near a given pixel, estimating a dominant orientation for pixels in the local area of the input image, and selecting a pre-generated stochastic screen from a set of pre-generated stochastic screens as a function of the estimated dominant pixel orientation. The method further comprises determining seed points as a function of the measured spatial activity and the selected screen, evaluating a spot function at least in part as a function of a tessellation determined by seed point locations to generate an output value for each pixel, thresholding each pixel in the input image using the output value for each pixel to generate a binarized halftone image, and outputting the halftone image.

In another aspect, a system that facilitates halftoning an image using a spot function to binarize pixels as a function of image frequency content and pixel orientation comprises a processor configured to receive an input image, measure spatial activity in a local area of the input image near a given pixel, and estimate a dominant orientation for pixels in the local area of the input image. The processor is further configured to select a pre-generated stochastic screen from a set of pre-generated stochastic screens as a function of the estimated dominant pixel orientation, determine seed points as a function of the measured spatial activity and the selected screen, evaluate a spot function at least in part as a function of a tessellation determined by seed point locations to generate an output value for each pixel, and threshold each pixel in the input image using the output value for each pixel to generate a binarized halftone image. The system further comprises a printer that outputs the halftone image.

In yet another aspect, a computer-implemented method for generating a halftone image using image frequency content and pixel orientation information comprises measuring spatial activity in a local area around each pixel in an input image, determining a dominant orientation of pixels in the local area, and selecting a stochastic screen from a set of pre-generated stochastic screens as a function of the estimated dominant orientation. The method further includes identifying seed points using selected screen, tessellating the identified seed points to generate encompassing triangles that each encompass at least one pixel, and evaluating a spot function at least in part as a function of the tessellation to generate an output value for each pixel. Additionally, the method includes thresholding each pixel in the input image using the output value for each pixel to generate a halftone image, and outputting the halftone image.

BRIEF DESCRIPTION OF THE DRAWINGS

FIGS. 6A and 6B show examples of halftoned images in which the enhanced edge and detail-rendering capabilities of the described systems and methods are visible.

DETAILED DESCRIPTION

The above-described problem is solved by providing a halftoning method that achieves improved detail rendition by determining seed locations according to local spatial characteristics of the image, namely its frequency content and orientation. In general, the halftone structures are defined by: for each pixel in the image, determining the dominant orientation and amount of spatial variation (frequency content) in the area about the pixel; determining seed locations according to the determined orientation and spatial variation activity; and evaluating or executing a halftone spot function based on a tessellation determined by the seed locations. The dependence of the seed locations on the local image characteristics is achieved by choosing a best fitting screen among a previously generated set of stochastic screens, each one having a principal frequency and orientation. The screen that best represents the orientation and degree of activity of the local image area is chosen for use when halftoning, thus achieving better edge and detail rendition.

Figure 1:
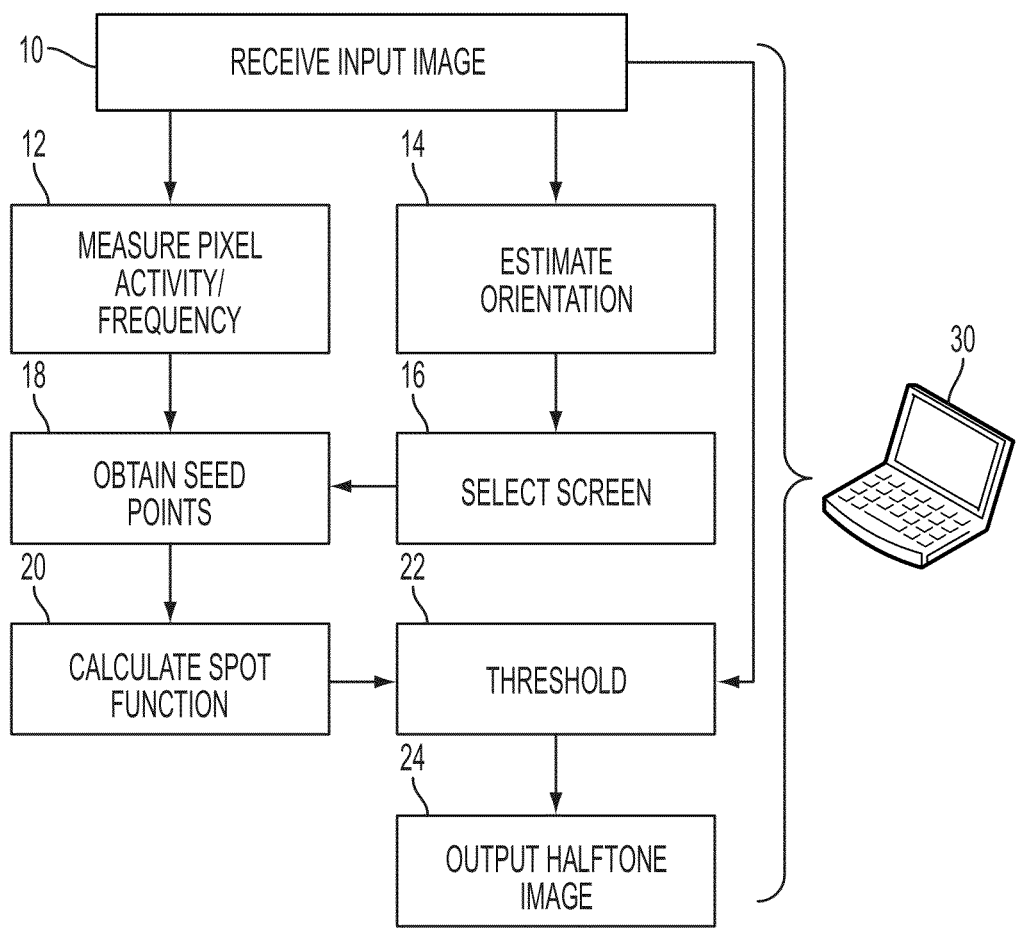
FIG. 1 illustrates a $2^{nd}$ generation halftoning method that determines seed locations based on the local image characteristics in order to produce binary images with enhanced edge and detail rendition.

FIG. 1 illustrates a $2^{nd}$ generation halftoning method that determines seed locations based on the local image characteristics in order to produce binary images with enhanced edge and detail rendition. Conventional 2$^{nd}$ generation halftone methods use dispersed-dot dithering techniques such as error diffusion or stochastic screening to determine seed locations, which typically results in a limited range of seed frequencies. In contrast, the method of FIG. 1 provides texture- and orientation-adaptive seeding: the stochastic screen that best correlates with the local image characteristics is chosen among a set of pre-designed screen candidates. The resulting halftone image exhibits a larger number of seeds in areas with busier spatial activity (i.e., relatively higher pixel frequency compared to other image areas), effectively increasing the principal frequency of the halftone where improved detail rendition is desired. Additionally, the positions of the seeds tend to follow the general orientation of the image so that rendition of edges and lines is improved regardless of their orientation.

At 10, an input image is received for halftoning. The input image may be an electronic image of a scanned document, a digital photograph, or other suitable electronic image file. At 12, for each pixel in the image, the spatial activity of the local area where the pixel is located is determined. At 14, for each pixel in the image, the dominant orientation of the local area where the pixel is located is determined. It will be appreciated that steps 12 and 14 may be performed concurrently, in accordance with various aspects described herein. At 16, a halftoning screen is selected from a plurality of pre-generated screens, as a function of the determined orientation of the local area in which the given pixel is located. At 18, seed points for growing halftone dots according to a spot function are determined or obtained, as a function of the selected screen (and/or the estimated orientation used to select the screen) and the determined spatial activity. At 20, the halftone spot function is evaluated for the given pixel based on a tessellation determined by the seed locations and the image is thus binarized. At 22, the pixel is thresholded (i.e., binarized) using the output value from the spot function and the input image data At 24, a halftoned output image is generated, e.g., by printing the halftoned image, displaying the halftoned image on a graphical user interface (GUI), or the like.

It will be appreciated that the method of FIG. 1 can be implemented by a computer 30, which comprises a processor (such as the processor 104 of FIG. 8) that executes, and a memory (such as the memory 106 of FIG. 8) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 8), a system memory (see, e.g., FIG. 8), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

When determining the dominant orientation and texture (spatial activity) of a given pixel's local image area at 12 and 14, image orientation and activity can be estimated in several ways. For example, the magnitude of a local gradient can serve as an estimate of the amount of spatial activity, and its angle can be used to estimate the dominant orientation. Transform-based methods such as Principal Component Analysis, Gabor Filtering, and Fourier, cosine or wavelet decomposition can also be used.

In another example, steps 12 and 14 are performed by partitioning the input image into blocks, e.g., of 8×8 pixels (or some other suitable block size) and using the discrete cosine transform (DCT) AC coefficients (e.g., of a JPEG compressed image or the like) of each block to determine the dominant orientation. For instance, in an 8×8 block of pixels, the 64 DCT coefficients corresponding thereto include a DC coefficient and 63 AC coefficients, wherein the DC coefficient is the zero frequency in both dimensions [0,0], and the 63 AC coefficients have non-zero frequencies.

Figure 2:
FIG. 2 illustrates a graphical representation of first-level JPEG basis functions, such as may be employed to determine the spatial activity and dominant orientation of the pixel's local area.

With continued reference to FIG. 1, FIG. 2 illustrates a graphical representation 40 of first-level JPEG basis functions, such as may be employed to determine the spatial activity and dominant orientation of the pixel's local area (e.g., an 8×8 block in which the pixel is located) at steps 12 and 14. Intuitively, a larger coefficient (0,1) indicates variation in the vertical direction of the local image block. Similarly, the absolute values of coefficients (1,0) and (1,1) are proportional to the horizontal and diagonal edge activity of the local image block, respectively. Using this understanding of these relationships, the magnitude of the AC coefficients can be used to estimate the principal orientation of activity within the image block. In one embodiment, the method of FIG. 1 approximates the local orientation to one of four possible angle values, from −45° to 90° in steps of 45° by using only the first-level JPEG decomposition coefficients. In another embodiment, a the estimation of orientation uses a larger number of coefficients. The estimated angle of orientation corresponds to that of the JPEG coefficient with the largest absolute value. If the largest coefficient is that in position (1,1), then the sign is also taken into account: a positive coefficient is indicative of a −45° angle whereas a negative coefficient is indicative of a 45° orientation.

The JPEG coefficients also carry information about the amount of local spatial variation or activity. According to Parseval's theorem, the sum of all AC coefficients in the DCT decomposition equals the energy or variance of the image coefficients in the spatial domain. Therefore, the estimation of the spatial activity at step 14 can be performed by summing the first-level AC coefficients of the DCT decomposition of each image block.

When determining seed point locations at 18 according to the determined spatial activity and estimated orientation and/or selected screen, once the dominant direction of the local image block is determined, its corresponding halftone screen is used to halftone an 8×8 pixel block with constant value equal to the spatial activity estimate calculated at 12. The effects of this operation are twofold: first, the location of the seeds will be more pronounced along the direction of the overall orientation of the image block; second, image blocks with larger spatial variability will have a larger number of seeds, effectively increasing the local frequency of the halftone, thereby improving detail rendition in areas with high activity.

Figure 3A:
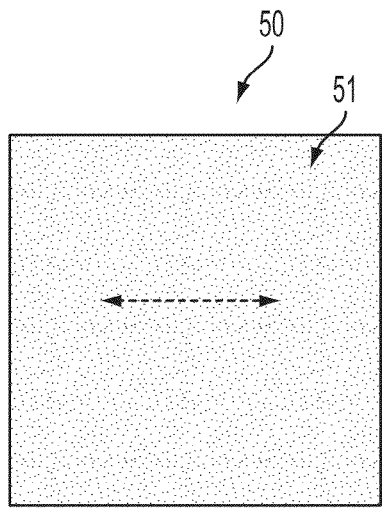
FIGS. 3A-3D illustrate four differently-oriented stochastic screens.
Figure 3B:
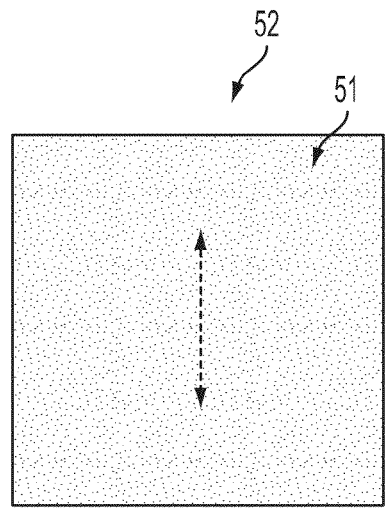
Figure 3C:
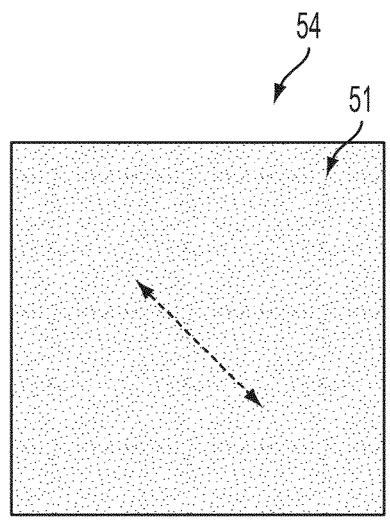
Figure 3D:
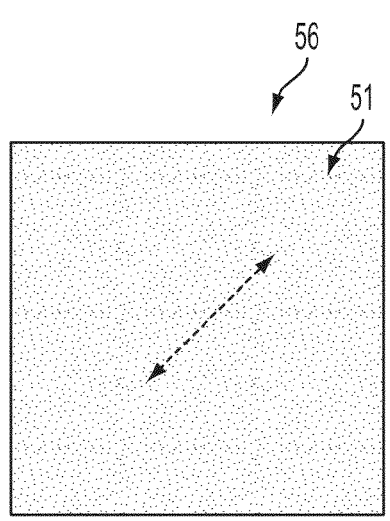

With continued reference to FIGS. 1 and 2, FIGS. 3A-3D illustrate four differently-oriented stochastic screens (one for each possible angle estimated at 14). The illustrated stochastic screens represent examples of screens that may be pre-generated, in accordance with various aspects described herein, for selection at 16 based on the estimated dominant orientation at 14. FIG. 3A illustrates a stochastic screen 50 having seed points 51 arranged in a generally horizontal (0°) orientation. FIG. 3B illustrates a stochastic screen 52 having seed points 51 arranged in a generally vertical (90°) orientation. FIG. 3A illustrates a stochastic screen 54 having seed points 51 arranged in a generally diagonal (−45°) orientation. FIG. 3A illustrates a stochastic screen 56 having seed points 51 arranged in a generally diagonal (45°) orientation.

Figure 4:
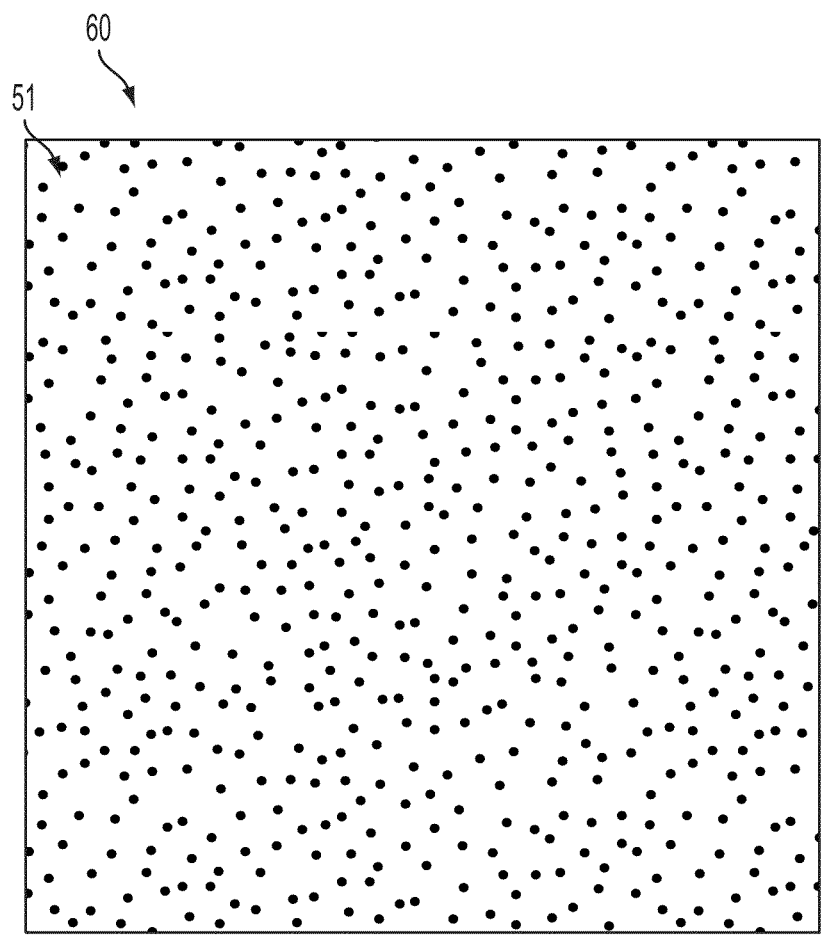
FIG. 4 illustrates a stochastic screen that includes seed points that are common to all of the pre-generated differently-oriented stochastic screens.

FIG. 4 illustrates a stochastic screen 60 that includes seed points that are common to all of the pre-generated differently-oriented stochastic screens illustrated in FIGS. 3A-3D. That is, in order to facilitate transitions between image regions of different orientations, all four screens differently-oriented screens of FIGS. 3A-3D have a common set of seed points, as shown in the screen 60 of FIG. 4, that are then grown in an appropriate manner to achieve the enhanced directionality effect. FIG. 4 shows this common set of seed points, which is also the output of the four differently-oriented stochastic screens 50, 52, 54, 56 with a constant input at a low common level.

With continued reference to FIGS. 1-4, when calculating the halftone spot function at step 20 and binarizing the image at step 22, triangulation of the seeds identified at step 18 permits the tessellation of the plane on which the image is located. A spot function for that plane tessellation is calculated at 20, and the image is then binarized by direct thresholding at 22 with the output values derived from the spot function at 20.

To calculate the spot function, according to one example, for each pixel, distances from the pixel's encompassing triangle vertices are determined, such as is discussed above with regard to step 20 of FIG. 1. The distances are determined from projections onto the triangle altitudes, or similarly, distances to the respective bases. An altitude of a triangle is a straight line through a vertex and perpendicular to the opposite side. The length of the altitude is the height H with respect to the given vertex. The opposite side is called the base of the altitude. The distances $h_1$, $h_2$ and $h_3$ are the distances from P to their respective bases, which are opposite the three vertices respectively. To implement a well-behaved (e.g., not fragmenting with controlled growth) spot function, the described method uses normalized heights (distances): $h_1/H_1$, $h_2/H_2$ and $h_3/H_3$, in accordance with various aspects.

The determined distances are employed to determine the value of a spot function that generates halftone thresholds. That is, the determined distances are input into the spot function. The spot function has parameters that can be adjusted to control its sharpness and slope. In one embodiment, the spot function is a weighted sum of three cosines that are functions of the three respective distances. Algebraic powers of the distances control sharpness of each dot touch point with its neighboring dots. Cosine weights control sequencing the touches, such that contact with neighboring dots can occur at different gray levels thereby avoiding instability that occurs for simultaneous touching. The spot function itself can be used to halftone an image, or a sampled version of the spot function can be applied as a threshold array for efficient implementation in a printer. Once all six distance values have been computed, the Q value of the pixel P is computed according to the following formula:

$$Q = a_1 \cos(\pi(2h_1/H_1)) + a_2 \cos(\pi(2h_2/H_2)) + a_3 \cos(\pi(2h_3/H_1)) \quad (1)$$

where $a_i$ are parameters that control the elongation of the dot along the direction defined by $H_i$. Note that since cosine is a symmetric function about $\pi$, the value of Q is the same regardless of whether the distances $h_i$ are calculated with respect to a triangle side or to a line parallel to that side passing through the opposite vertex.

If control over the roundness of the dot sides and the sharpness of corner touch points is desired, a new set of parameters $\gamma_i$ can be introduced:

$$Q = a_1 \cos(\pi(2h_1/H_1)^{\gamma_1}) + a_2 \cos(\pi(2h_2/H_2)^{\gamma_2}) + a_3 \cos(\pi(2h_3/H_1)^{\gamma_3}) \quad (2)$$

Note that when $\gamma_i \neq 0$ for some i, the choice over how to measure $h_i$ is no longer arbitrary since the symmetry of Q with respect to $h_i$ is lost. In this case, the selection is constrained to be the distance between the point and whichever line is closest to it, be it the triangle side or its imaginary parallel replication passing through the opposite triangle vertex.

Another level of control can be enabled by inverting the spot function, such that:

$$Q = -(a_1 \cos(\pi(2h_1/H_1)^{\gamma_1}) + a_2 \cos(\pi(2h_2/H_2)^{\gamma_2}) + a_3 \cos(\pi(2h_3/H_3)^{\gamma_3})) \quad (3)$$

The inversion allows for well controlled "holes," which can be desirable for dark image subject matter.

According to another aspect, data normalization is an additional step that can be performed with spot functions. Once all pixels in the matrix are processed, the resulting entries are shifted and scaled to fit the data range, such as [0,255] for an 8-bit system or [0,1023] for a 10-bit image path.

According to related aspects, where the spot function has identical or nearly identical output values for multiple pixels in a dot, the order of the multiple pixels can be determined by any of a number of secondary criteria. For, instance a marking process or imager may mark pixels in a more consistent manner if pixels are preferentially added to a side, such as the lead edge, or trail edge of the dot as it moves through the process or start-of-scan or end-of-scan side of a dot relative to a laser imager scanning direction. For instance, angular considerations can be used to rank pixels. That is, to have minimal displacement of the centroid of the dot from gray level to gray level, pixels with nearly identical dot shape function values are sometimes selected by spiraling around the dot in quadrant (or hextant, etc.) steps. As another example, printed dot consistency is sometimes achieved by preferentially growing a dot in a vertical or horizontal direction where pixels having nearly identical spot function values are ranked to provide more growth in the preferred direction. In some cases, the fill order for pixels of nearly identical spot function values could be random, or selected by any of a number of other criteria.

The output spot function value Q and an additional parameter such as an image pixel value is employed to generate a halftoned pixel. The spot function itself can be used to halftone an image, or a sampled version of the spot function can be applied as a threshold array for efficient implementation in a printer. Optionally, data normalization can be performed with the spot function. Once all pixels in the matrix are processed, the resulting entries are shifted and scaled to fit the data range, such as [0,255] for an 8-bit system or [0,1023] for a 10-bit image path.

According to another embodiment, where the spot function has identical or nearly identical values for multiple pixels in a dot, their order can be determined by any of a number of secondary considerations or parameters. For, instance a marking process or imager can mark pixels in a consistent manner if pixels are preferentially added to a side, such as the lead edge, or trail edge of the dot as it moves through the process or start-of-scan or end-of-scan aide of a dot relative to a laser imager scanning direction. In another embodiment, angular considerations are used to rank pixels. For instance, to have minimal displacement of the centroid of the dot from gray level to gray level, pixels with nearly identical dot shape function values are sometimes selected by spiraling around the dot in quadrant (or hextant, . . . ) steps. As another example, printed dot consistency can be achieved by preferentially growing a dot in a vertical or horizontal direction where pixels having nearly identical dot shape function values are ranked to provide more growth in the preferred direction. In some cases, the fill order for pixels of nearly identical dot shape function values can be random, or selected by any of a number of other criteria.

Figure 5B:
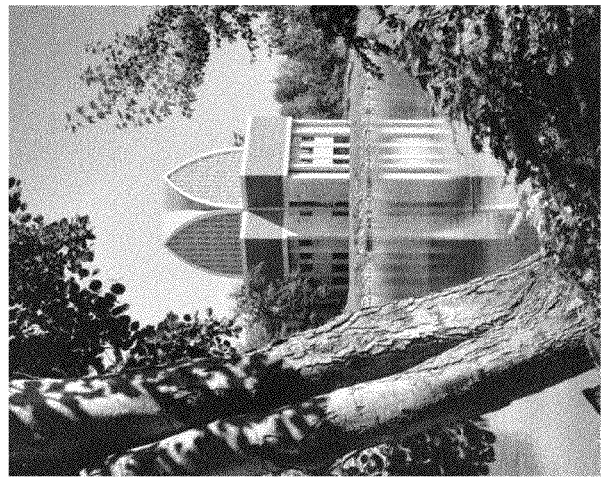
FIG. 5B illustrates a halftoned binary image.
Figure 5A:
FIG. 5A illustrates a contone input image.

FIGS. 5A-7B illustrate various examples of images that can be halftones using the described technique(s). FIG. 5A illustrates an input image 70, such as may be received at step 10 of FIG. 1. The image 70 is a contone image. FIG. 5B illustrates a halftoned image 72, such as may be generated using the described systems and methods. The image 72 is a binary image.

FIGS. 6A and 6B show examples of halftoned images 80, 82, respectively, in which the enhanced edge and detail-rendering capabilities of the described systems and methods are visible. It will be noted that the number of seeds increases on edge regions 84, independently of the gray values of the image, effectively increasing the frequency of the halftone around areas of increased spatial activity. It will also be noted that the seed arrangement follows the edge orientation, even for cases where the edge has continuously changing orientation.

Figure 7A:
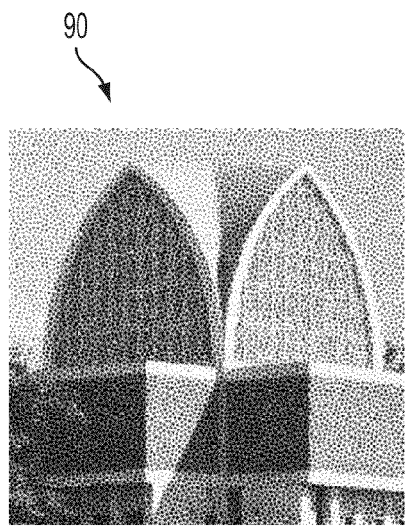
FIG. 7A shows an example of an image generated using a $2^{nd}$ generation halftoning algorithm at a low end of a principal frequency range employed by the herein-described techniques.
Figure 7B:
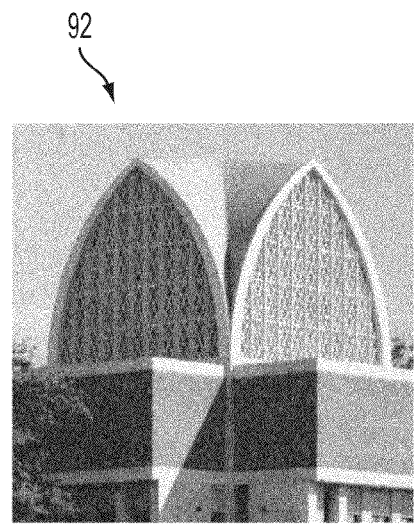
FIG. 7B shows an example of an image generated using a $2^{nd}$ generation halftoning algorithm at a high end of a principal frequency range employed by the herein-described techniques.

FIG. 7A shows an example of an image 90 generated using a conventional $2^{nd}$ generation halftoning algorithm at a low end of a principal frequency range employed by the herein-described techniques. FIG. 7B shows an example of an image 92 generated using a conventional $2^{nd}$ generation halftoning algorithm at a high end of a principal frequency range employed by the herein-described techniques. An inspection of FIG. 7A shows that detail and edge rendition with a low-frequency conventional halftone technique are poor when compared with the performance of the herein-described technique (see, e.g., FIG. 5B). While the results of conventional halftoning techniques with a high frequency (FIG. 7B) are improved relative to the low frequency halftone image 90, such conventional approaches lack the level of tone reproduction on tints and usability on engines in which the stability of the marking process is a concern that are achieved by the described techniques.

Figure 8:
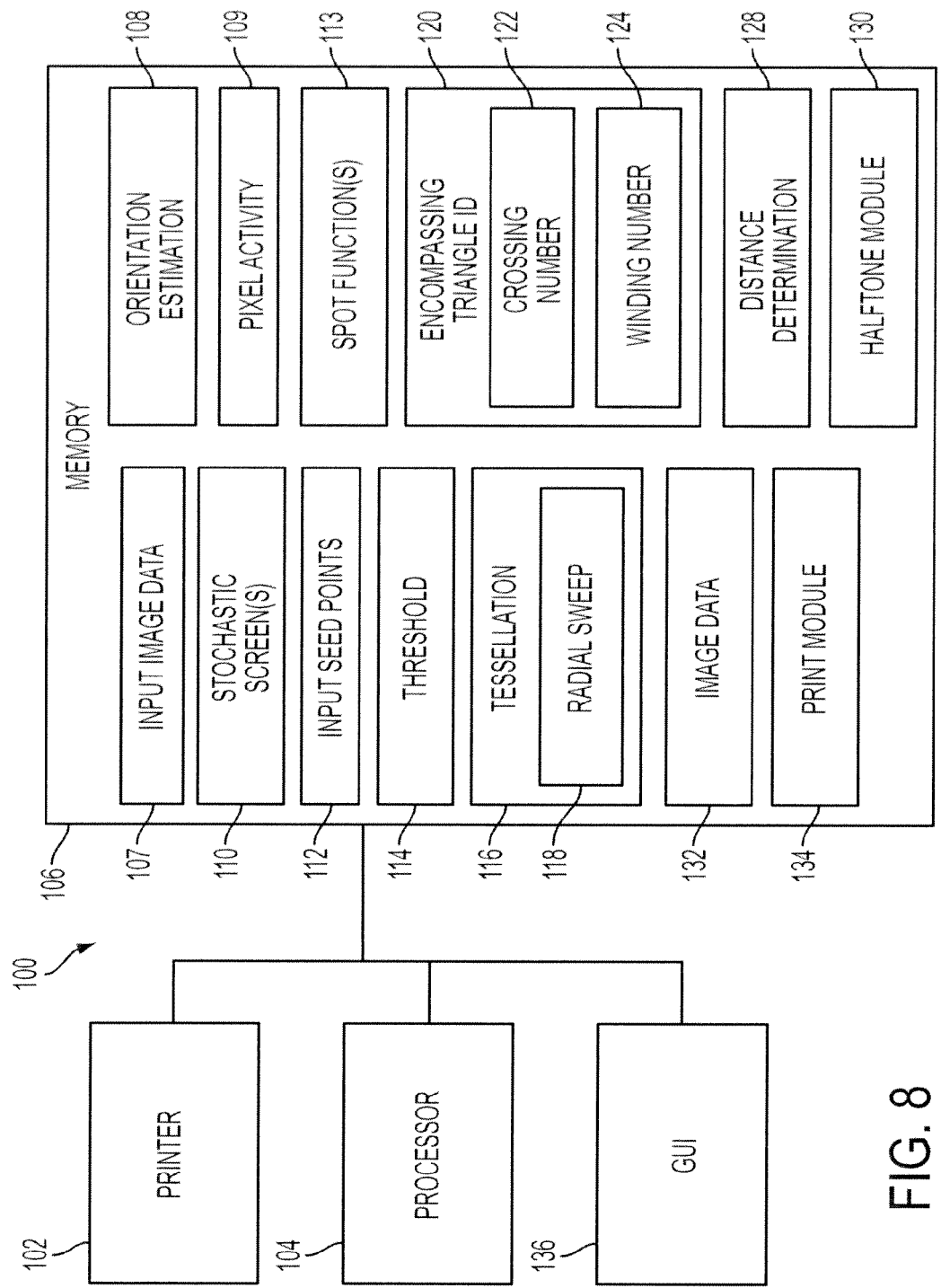
FIG. 8 illustrates a system that facilitates generating a halftone image by employing a spot function, in accordance with one or more aspects described herein.

FIG. 8 illustrates a system 100 that facilitates generating a halftone image by employing a spot function, in accordance with one or more aspects described herein. The system comprises a print engine 102 that is coupled to a processor 104 that executes, and a memory 106 that stores computer-executable instructions for performing the various functions, methods, techniques, steps, and the like described herein. The processor 104 and memory 106 may be integral to each other or remote but operably coupled to each other. In another embodiment, the processor 104 and memory 106 are integral to the printer 102. In another embodiment, the processor and memory reside in a computer (e.g., the computer 30 of FIG. 1) that is operably coupled to the printer 102.

As stated above, the system 100 comprises the processor 104 that executes, and the memory 106 that stores one or more computer-executable modules (e.g., programs, computer-executable instructions, etc.) for performing the various functions, methods, procedures, etc., described herein. Additionally, "module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

An input image 107 is received by the processor 104 and stored in the memory 106. The processor executes an orientation estimation module 108 that estimates an orientation of pixels in the input image (e.g., −45°, 0°, 45°, 90°, etc.), and a pixel activity module 109 that measures or estimates pixel frequency (e.g., clusters) in the input image. The results of the pixel activity estimation and/or the orientation determination are used by the processor to select an appropriate pre-generated stochastic screen 110, which is used to identify input seed points 112. The input points 112 and the stochastic screen(s) 110 are stored in the memory 106. The input seeds 112 can include boundary vertices and center points, which the processor identifies. Using the input seed locations, the processor executes a spot function 113 to generate an output spot function value for each pixel. The processor 104 executes a thresholding module 114 to binarized the output spot function values for generating a halftoned image.

For instance, the processor 104 executes a triangle tessellation module 116 to generate a triangle tessellation based on the seed locations. For example, the input points or seeds 112 may be arranged in an irregular or non-uniform grid-like pattern, such as is shown in FIGS. 3A-3D. The tessellation module 116 includes a radial sweep triangulation module 118, or any other suitable triangulation module. The radial sweep module, when executed by the processor, causes a central point of a set of points to be connected to other points radially. Triangles are then formed by connecting radial edges together.

The processor 104 executes an encompassing triangle identification module 120 that identifies "encompassing" triangles in which a pixel resides on a pixel-by-pixel basis. For instance, a crossing number module 122 can be executed, which follows a ray that passes through a given pixel and identifies the triangle whose sides intersect the ray twice, once on each side of the pixel P. According to another aspect, a winding number module 124 is executed, which counts the number of times the triangle winds around the pixel. If the winding number is 0, the point is outside the triangle; otherwise, it is inside.

The processor 104 executes a distance determination module 128 that determines or calculates each pixel's distance from its encompassing triangle's bases. That is, the distance h from each pixel to each base or side of its encompassing triangle is determined or calculated. The distance determination module 128 also calculates or determines three heights H for each triangle, including a height from each vertex to its opposite base or side. In this manner, six height or distance values are calculated: three pixel heights, which can be identified as $h_1$, $h_2$, and $h_3$, and three triangle heights, which can be identified as $H_1$, $H_2$, and $H_3$. Once the six height values are determined for each pixel, the processor inputs the height values into a spot function on a pixel-by-pixel basis to determine output values that are used to generate halftone thresholds. In one example, the spot function is executed for each pixel as soon as the height values H, h are available. In another example, the spot function is executed for all pixels once all pixels' height values H, h have been determined.

The processor 104 then executes a halftone module 130 that uses the spot function output values for each pixel, optionally with one or more secondary criteria or considerations such as an image pixel value for the pixel (e.g., a brightness and/or color value), to halftone an image. Image data 132 is stored in the memory 106 and may include input image data from which an input point seed grid is generated, intermediate image data that is generated at various points during the described process, output image data such as halftone image data, etc. The output image data is provided to a print module 134 that, when executed y the processor 104, generates a set of commands or instructions that are executed by the processor 104 and/or the printer 102 to print the halftone image. In another embodiment, the output halftone image is displayed graphically on a graphical user interface 136 that may be integral to the printer 102, remote but operably coupled thereto, or may reside on a computer such as the computer 30 of FIG. 1. In this manner, the system 100 can be employed to directly halftone an image or can be used to generate a sampled version of the spot function about a collection of seeds to yield a digital halftone cell that can be used to halftone an image.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for generating a halftone image using a spot function to binarize pixels as a function of image frequency content and pixel orientation, comprising:
    receiving an input image;
    measuring spatial activity in a local area of the input image near a given pixel;
    estimating a dominant orientation for pixels in the local area of the input image;
    selecting a pre-generated stochastic screen from a set of pre-generated stochastic screens as a function of the estimated dominant pixel orientation;
    determining seed points as a function of the measured spatial activity and the selected screen;
    evaluating a spot function at least in part as a function of a tessellation determined by seed point locations to generate an output value for each pixel;
    thresholding each pixel in the input image using the output value for each pixel to generate a binarized halftone image; and
    outputting the halftone image.

2. The method according to claim 1, wherein measuring the spatial activity further comprises determining a magnitude of a local gradient of pixels, and wherein estimating the dominant orientation of the local area comprises determining an angle of the local gradient of pixels.

3. The method according to claim 1, wherein the spatial activity and dominant orientation are determined at least in part using a transform-based technique comprising one or more of:
    principal component analysis;
    Gabor filtering;
    Fourier decomposition;
    cosine decomposition; and
    wavelet decomposition.

4. The method according to claim 1, wherein the dominant orientation is determined at least in part by partitioning the image into blocks of a predefined size and evaluating the discrete cosine transform (DCT) coefficients of each block.

5. The method according to claim 4, wherein the blocks have a predefined size of 8×8 pixels, and wherein the DCT coefficients comprise a DC coefficient having a zero frequency in two dimensions [0,0] and 63 AC coefficients having non-zero frequencies in one or both of the two dimensions.

6. The method according to claim 1, wherein the dominant orientation is determined using first-level JPEG decomposition coefficients to be one of four possible angle values ranging from −45° to 90° in 45° increments.

7. The method according to claim 1, wherein determining seed point locations comprises using the selected screen to halftone an 8×8 pixel block having a constant value equal to the measured spatial activity.

8. The method according to claim 1, further comprising triangulating the determined seed points to generate a tessellation of a plane in which the input image is located, and identifying encompassing triangles that each encompass at least one pixel.

9. The method according to claim 8, further comprising:
    determining pixel-intersecting heights $h_1$, $h_2$ and $h_3$ from the at least one pixel to respective bases of the encompassing triangle in which the at least one pixel is located, wherein the encompassing triangle has heights $H_1$, $H_2$, and $H_3$, and wherein the spot function is defined as at least one of:

$$Q=a_1\cos(\pi(2h_1/H_1))+a_2\cos(\pi(2h_2/H_2))+a_3\cos(\pi(2h_3/H_1)) \quad (1)$$

wherein $a_i$ are parameters that control the elongation of a dot along the direction defined by $H_i$ and Q is the output value of the spot function;

$$Q=a_1\cos(\pi(2h_1/H_1)^{\gamma 1})+a_2\cos(\pi(2h_2/H_2)^{\gamma 2})+a_3\cos(\pi(2h_3/H_1)^{\gamma 3}) \quad (2)$$

wherein $a_i$ are parameters that control the elongation of a dot along the direction defined by $H_i$, wherein Q is the output value of the spot function, and wherein $\gamma_i$ is a parameter that governs roundness of the dot sides and the sharpness of corner touch points; and $$Q=-(a_1\cos(\pi(2h_1/H_1)^{\gamma 1})+a_2\cos(\pi(2h_2/H_2)^{\gamma 2})+a_3\cos(\pi(2h_3/H_3)^{\gamma 3})) \quad (3)$$

wherein $a_i$ are parameters that control the elongation of a dot along the direction defined by $H_i$, wherein Q is the output value of the spot function, and wherein $\gamma_i$ is a parameter that governs roundness of the dot sides and the sharpness of corner touch points.

10. A processor configured to execute computer-executable instructions for performing the method of claim 1, the instructions being stored on a non-transitory computer-readable medium.

11. A system that facilitates halftoning an image using a spot function to binarize pixels as a function of image frequency content and pixel orientation, comprising:
a processor configured to:
receive an input image;
measure spatial activity in a local area of the input image near a given pixel;
estimate a dominant orientation for pixels in the local area of the input image;
select a pre-generated stochastic screen from a set of pre-generated stochastic screens as a function of the estimated dominant pixel orientation;
determine seed points as a function of the measured spatial activity and the selected screen;
evaluate a spot function at least in part as a function of a tessellation determined by seed point locations to generate an output value for each pixel; and
threshold each pixel in the input image using the output value for each pixel to generate a binarized halftone image; and
a printer that outputs the halftone image.

12. The system according to claim 11, wherein measuring the spatial activity further comprises determining a magnitude of a local gradient of pixels, and wherein estimating the dominant orientation of the local area comprises determining an angle of the local gradient of pixels.

13. The system according to claim 11, wherein the spatial activity and dominant orientation are determined at least in part using a transform-based technique comprising one or more of:
principal component analysis;
Gabor filtering;
Fourier decomposition;
cosine decomposition; and
wavelet decomposition.

14. The system according to claim 11, wherein the dominant orientation is determined at least in part by partitioning the image into blocks of 8×8 pixels and evaluating the discrete cosine transform (DCT) coefficients of each block, and wherein the DCT coefficients comprise a DC coefficient having a zero frequency in two dimensions [0,0] and 63 AC coefficients having non-zero frequencies in one or both of the two dimensions.

15. The system according to claim 11, wherein the dominant orientation is determined using first-level JPEG decomposition coefficients to be one of four possible angle values ranging from −45° to 90° in 45° increments.

16. The system according to claim 11, wherein determining seed point locations comprises using the selected screen to halftone an 8×8 pixel block having a constant value equal to the measured spatial activity.

17. The system according to claim 11, further comprising triangulating the determined seed points to generate a tessellation of a plane in which the input image is located, and identifying encompassing triangles that each encompass at least one pixel.

18. The system according to claim 17, further comprising:
determining pixel-intersecting heights $h_1$, $h_2$ and $h_3$ from the at least one pixel to respective bases of the encompassing triangle in which the at least one pixel is located, wherein the encompassing triangle has heights $H_1$, $H_2$, and $H_3$, and wherein the spot function is defined as at least one of:

$$Q=a_1\cos(\pi(2h_1/H_1))+a_2\cos(\pi(2h_2/H_2))+a_3\cos(\pi(2h_3/H_1)) \quad (1)$$

wherein $a_i$ are parameters that control the elongation of a dot along the direction defined by $H_i$, and Q is the output value of the spot function;

$$Q=a_1\cos(\pi(2h_1/H_1)^{\gamma 1})+a_2\cos(\pi(2h_2/H_2)^{\gamma 2})+a_3\cos(\pi(2h_3/H_1)^{\gamma 3}) \quad (2)$$

wherein $a_i$ are parameters that control the elongation of a dot along the direction defined by $H_i$, wherein Q is the output value of the spot function, and wherein $\gamma_i$ is a parameter that governs roundness of the dot sides and the sharpness of corner touch points; and $$Q=-(a_1\cos(\pi(2h_1/H_1)^{\gamma 1})+a_2\cos(\pi(2h_2/H_2)^{\gamma 2})+a_3\cos(\pi(2h_3/H_3)^{\gamma 3})) \quad (3)$$

wherein $a_i$ are parameters that control the elongation of a dot along the direction defined by $H_i$, wherein Q is the output value of the spot function, and wherein $\gamma_i$ is a parameter that governs roundness of the dot sides and the sharpness of corner touch points.

19. A computer-implemented method for generating a halftone image using image frequency content and pixel orientation information, comprising:
measuring spatial activity in a local area around each pixel in an input image;
determining a dominant orientation of pixels in the local area;
selecting a stochastic screen from a set of pre-generated stochastic screens as a function of the estimated dominant orientation;
identifying seed points using selected screen;
tessellating the identified seed points to generate encompassing triangles that each encompass at least one pixel;
evaluating a spot function at least in part as a function of the tessellation to generate an output value for each pixel;
thresholding each pixel in the input image using the output value for each pixel to generate a halftone image; and
outputting the halftone image.

* * * * *